2 Sheets—Sheet 1.

C. H. ROBISON.
MACHINES FOR MAKING HEXAGONAL NUT-BLANK BARS.

No. 185,836. Patented Jan. 2, 1877.

Witnesses.
R H Roberts
L Mansfield

Inventor.
C. H. Robinson
Per Burridge & Co.
Attys.

2 Sheets—Sheet 2.
C. H. ROBISON.
MACHINES FOR MAKING HEXAGONAL NUT-BLANK BARS.
No. 185,836. Patented Jan. 2, 1877.
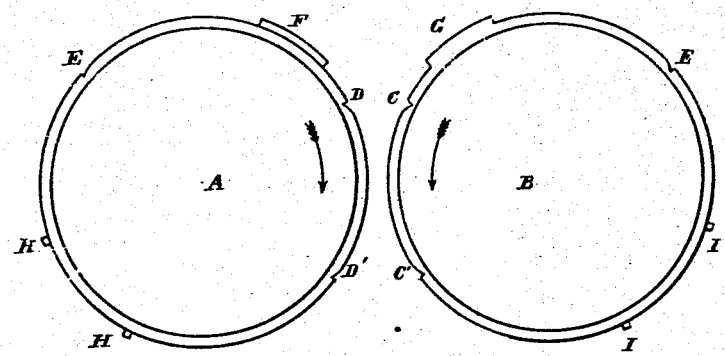
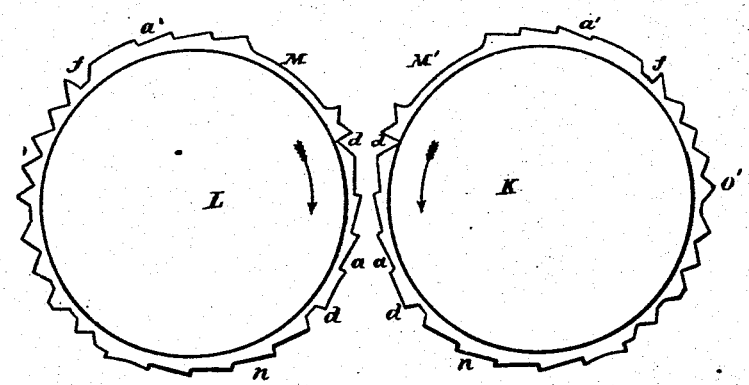
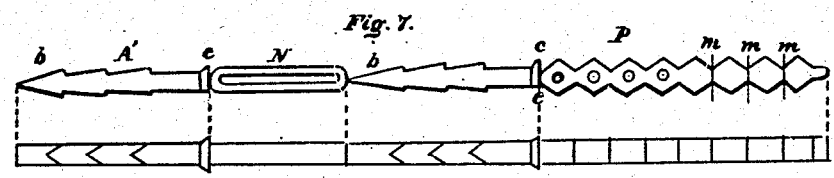
Witnesses
R. H. Roberts
L. Mansfield
Inventor
C. H. Robinson
Per Burridge & Co.
Attys.

UNITED STATES PATENT OFFICE.

CHARLES H. ROBISON, OF CLEVELAND, OHIO.

IMPROVEMENT IN MACHINES FOR MAKING HEXAGONAL NUT-BLANK BARS.

Specification forming part of Letters Patent No. 185,836, dated January 2, 1877; application filed September 25, 1876.

*To all whom it may concern:*

Be it known that I, CHARLES H. ROBISON, of Cleveland, in the county of Cuyahoga and State of Ohio, have invented new and useful Improvements in Machine for Making Nut-Blank Bars, of which the following is a description, reference being had to the accompanying drawings, making a part of this specification, in which—

Figure 1:
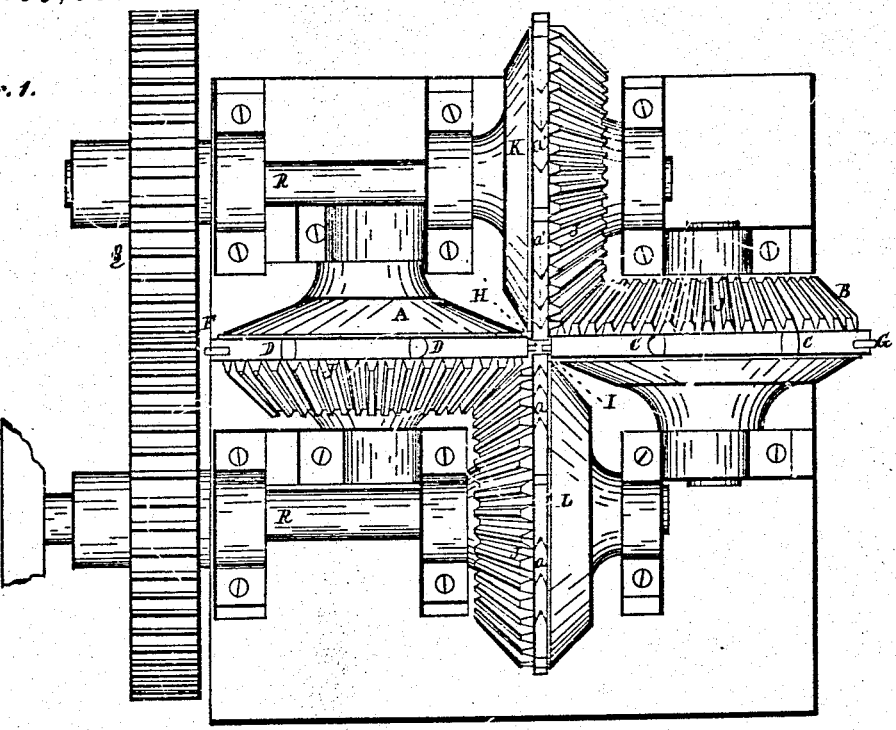
Figure 2:
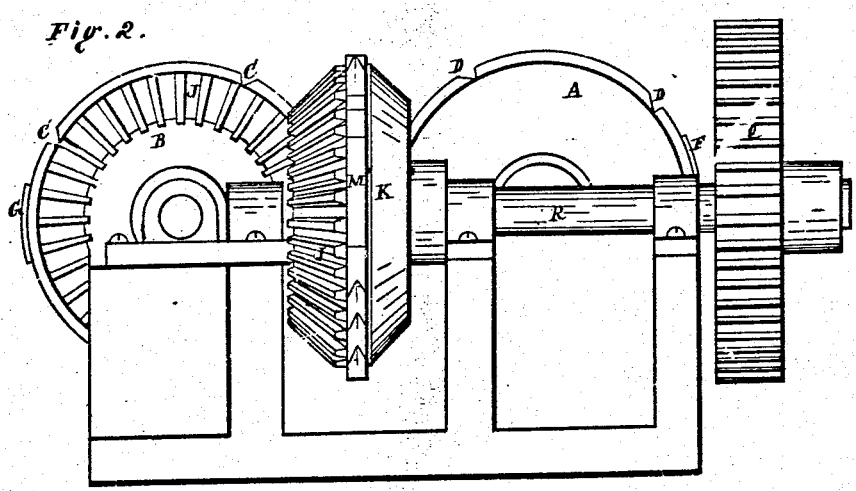

Figure 1 is a plan view of the machine. Fig. 2 is a front view; and Figs. 3, 4, 5, and 6 are detached sections.

Like letters of reference refer to like parts in the several views.

This invention is a machine for making nut-blank bars, which consists of four rollers, the axial lines of which are in the same plane, and at right angles in respect to each other, thereby approximating the peripheries of the rollers between which the metal is passed for forming the article above specified. In the face of the rollers are prints or dies for forming and shaping the aforesaid article.

The following is a detailed description of the construction and operation of the aforesaid machine.

In the drawings, A and B, Fig. 1, represent a pair of rollers, the axial lines of which are in the same plane, and parallel in respect to each other. The peripheries of said rollers are approximated to each other, as will be seen in Figs. 1, 3, and 4. In the face or periphery of said rollers are cut notches C D E. The relative positions of the notches in one roller correspond to the notches in the other; hence, as the rollers revolve, the notches therein, respectively, will coincide. Also, on the face of each roller is a projecture, respectively, F G, the relative positions of which on the rollers are such that as they revolve the projectures will coincide. From the face of each of the rollers project pins or punches, respectively, H and I, Figs. 3 and 4, which, as the rollers are made to revolve, also coincide, as will be seen in Fig. 1. Each of the rollers referred to is provided with a miter-gear, J, whereby they are made to engage a pair of rollers, K L, as will be seen in Fig. 1, the axial lines of which are in the same plane with the axial lines of the rollers A B, and at right angles therewith, as will be seen in the drawings.

In the periphery of each of the rollers K L are made the prints or dies *a a'*, Figs. 5 and 6. Said spike-dies have a certain relation to the notches D, C, and E in the rollers A B, and with which they co-operate for making a spike.

In the face of the rollers L K are dies or forms M M', which have a coincident relation to each other, and co-operate with the projectures F G on the rollers A B, for making a link. The serratures O and O' in the face of the rollers L K have also a certain co-relation to each other, which, as the rollers revolve, approximate and co-operate for forming the nut-blank bar P, Fig. 7.

The peripherical relations of the four rollers above described will be seen in Fig. 1, in which it will be observed that the face of each of the rollers L K is between the face of the rollers A B—that is to say, the faces of the rollers A B lap a little onto the sides of the rollers L K, which may be so approximated as to touch and run thereon, but without much pressure.

The rollers L K are, respectively, operated by the gearing Q, secured to the shaft R, carrying the rollers, and which, in turn, operate the rollers A B. By virtue of the miter-gearing connection of the several rollers they have a synchronal movement, thereby causing a coincident relation of the respective forms or dies on the face of the rollers during their revolution.

The practical operation of the above-described machine is as follows: At an opportune moment during the revolution of the rollers a bar of iron, proper for being converted into a nut-blank bar, is inserted between them. At this time, the serratures O O' becoming coincident in their relation to each other, the said bar passes between them, and is thereby serrated, as seen at P in Fig. 7, converting it by this operation into a nut-blank bar, which, when separated through the lines *m*, produce hexagonal nut-blanks. The holes therein are made by the punches H I, which, in due time in the course of the revolution of the rollers, become in exact position and relation to the blanks to punch them from either side, leaving a thin burr in the middle, which is easily removed for further operation to be performed on the blank to convert it into a properly-shaped nut.

The purpose of having the side rollers A B embrace the sides of the rollers L K is to prevent a lateral spreading of the metal while it is being operated upon by the rollers L K, and thus avoiding the formation of fins on the article made thereby.

In forming nut-blank bars as above described, there is but little, if any, waste of metal caused by punching. The waste in the form of burrs usually resulting from the employ of punches is, by this machine, forced into the article made thereby; hence, a large saving in material is made.

I do not claim in this machine the link-spike and nut dies combined as herein described and shown.

What I claim as my invention, and desire to secure by Letters Patent, is—

The rollers A B and rollers L K, operating conjointly, and so arranged in respect to each other that the axial lines of said rollers shall be in the same plane, and the rollers A B set at right angles to the rollers L K, with approximated peripheries, in combination with the serratures O O' and punches H I, for forming nut-blank bars and punching the same by one continuous operation, in the manner substantially as described, and for the purpose set forth.

CHARLES H. ROBISON.

Witnesses:
J. H. BURRIDGE,
S. M. HILL.